United States Patent
Meyers et al.

(10) Patent No.: US 12,316,622 B1
(45) Date of Patent: May 27, 2025

(54) PROTECTION OF PUBLIC-FACING COMPUTING ASSETS OF AN ORGANIZATION

(71) Applicant: Trend Micro Incorporated, Tokyo (JP)

(72) Inventors: Russell Meyers, Austin, TX (US);
Michael Habibi, Austin, TX (US);
Chin-En Yang, Austin, TX (US);
Juifang Chen, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 306 days.

(21) Appl. No.: 18/178,090

(22) Filed: Mar. 3, 2023

(51) Int. Cl.
*H04L 29/06* (2006.01)
*H04L 9/40* (2022.01)

(52) U.S. Cl.
CPC ...... *H04L 63/0823* (2013.01); *H04L 63/1466* (2013.01); *H04L 63/166* (2013.01)

(58) Field of Classification Search
CPC ............. H04L 63/0823; H04L 63/1466; H04L 63/166
See application file for complete search history.

(56) References Cited

U.S. PATENT DOCUMENTS

| | | | | |
|---|---|---|---|---|
| 2006/0200666 | A1* | 9/2006 | Bailey | H04L 63/102 713/168 |
| 2014/0344937 | A1* | 11/2014 | Sabin | H04L 63/1433 726/25 |
| 2015/0310215 | A1* | 10/2015 | McBride | G06F 21/577 726/25 |
| 2021/0034733 | A1* | 2/2021 | Grobelny | G06F 21/44 |
| 2021/0105304 | A1* | 4/2021 | Kraning | G06Q 10/08 |
| 2022/0385678 | A1* | 12/2022 | Bobak | H04L 41/22 |
| 2023/0019180 | A1* | 1/2023 | de Nijs | G06F 21/577 |

OTHER PUBLICATIONS

"Tenable Attack Surface Management", https://www.tenable.com/products/tenable-asm, Copyright 2023, downloaded Feb. 6, 2023.
"Detection and Response Across Email, Endpoint, Server, Cloud Workloads, and Networks", https://www.trenddefense.com/Vision-One.asp, Copyright 2000-2023, downloaded Feb. 6, 2023.
Shacklett et al., "What is a Digital Certificate?", https://www.techtarget.com/searchsecurity/definition/digital-certificate, Sep. 2021, downloaded Feb. 6, 2023.

(Continued)

*Primary Examiner* — Vance M Little
(74) *Attorney, Agent, or Firm* — Beyer Law Group LLP

(57) ABSTRACT

A system for protecting public-facing computing assets of an organization includes a correlation system and security appliances. Public-facing computing assets of the organization are discovered as being accessible from the Internet. The security appliances monitor network traffic between monitored computing assets of the organization and clients on the Internet. The correlation system correlates certificate information of digital certificates of the monitored computing assets with certificate information of digital certificates of the discovered public-facing computing assets to identify an unprotected computing asset.

20 Claims, 3 Drawing Sheets

(56) References Cited

OTHER PUBLICATIONS

Katie Terrell Hanna, "What is an Attack Surface?", https://www.techtarget.com/whatis/definition/attack-surface, Sep. 2021, downloaded Feb. 6, 2023.

"What is External Attack Surface Management (EASM)?" https://www.crowdstrike.com/cybersecurity-101/external-attack-surface-management/, Dec. 5, 2022, downloaded Feb. 6, 2023.

* cited by examiner

PROTECTION OF PUBLIC-FACING COMPUTING ASSETS OF AN ORGANIZATION

TECHNICAL FIELD

The present disclosure is directed to cybersecurity.

BACKGROUND

A computing asset includes hardware and/or software that are owned or operated by an organization. Examples of computing assets include Web servers, database servers, cloud computing resources (e.g., Amazon Web Services™ accounts), etc. A computing asset may be physical (e.g., a server computer) or virtual (e.g., a virtual machine instance on a cloud computing platform). Computing assets that are accessible from the Internet or other public computer network are referred to as "public-facing." Because of its accessibility from the Internet, a public-facing computing asset is highly vulnerable to cyberattacks. Various measures can be taken to protect public-facing computing assets from cyberattacks. However, it is relatively difficult for an organization with many computing assets to identify which ones are protected or unprotected.

BRIEF SUMMARY

In one embodiment, a method of protecting public-facing computing assets of an organization includes receiving a first set of certificate information of digital certificates of discovered public-facing computing assets of a plurality of computing assets of the organization, the discovered public-facing computing assets being discovered to be accessible from the Internet. A plurality of security appliances monitor network traffic between clients on the Internet and monitored computing assets of the plurality of computing assets. A second set of certificate information of digital certificates of the monitored computing assets is captured in network traffic monitored by the plurality of security appliances. An unprotected computing asset of the plurality of computing assets is identified by correlating the first set of certificate information with the second set of certificate information, the unprotected computing asset not being protected by at least one of the plurality of security appliances. An identified unprotected computing asset may be protected by assigning a security appliance to protect the unprotected computing asset or enabling a security policy or filter in a security appliance that has been assigned to protect the unprotected computing asset.

In another embodiment, a system for protecting public-facing computing assets of an organization includes a plurality of security appliances and a correlation system. The plurality of security appliances are inline between clients on the Internet and monitored computing assets. The correlation system (a) receives a first set of certificate information of digital certificates of discovered public-facing computing assets of a plurality of computing assets of the organization, the discovered public-facing computing assets being discovered to be accessible from the Internet; (b) receives a second set of certificate information of digital certificates of the monitored computing assets; and (c) identifies an unprotected computing asset of the plurality of computing assets by correlating the first set of certificate information with the second set of certificate information, the unprotected computing asset not being protected by at least one of the plurality of security appliances. An identified unprotected computing asset may be protected by assigning a security appliance to protect the unprotected computing asset or enabling a security policy or filter in a security appliance that has been assigned to protect the unprotected computing asset.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
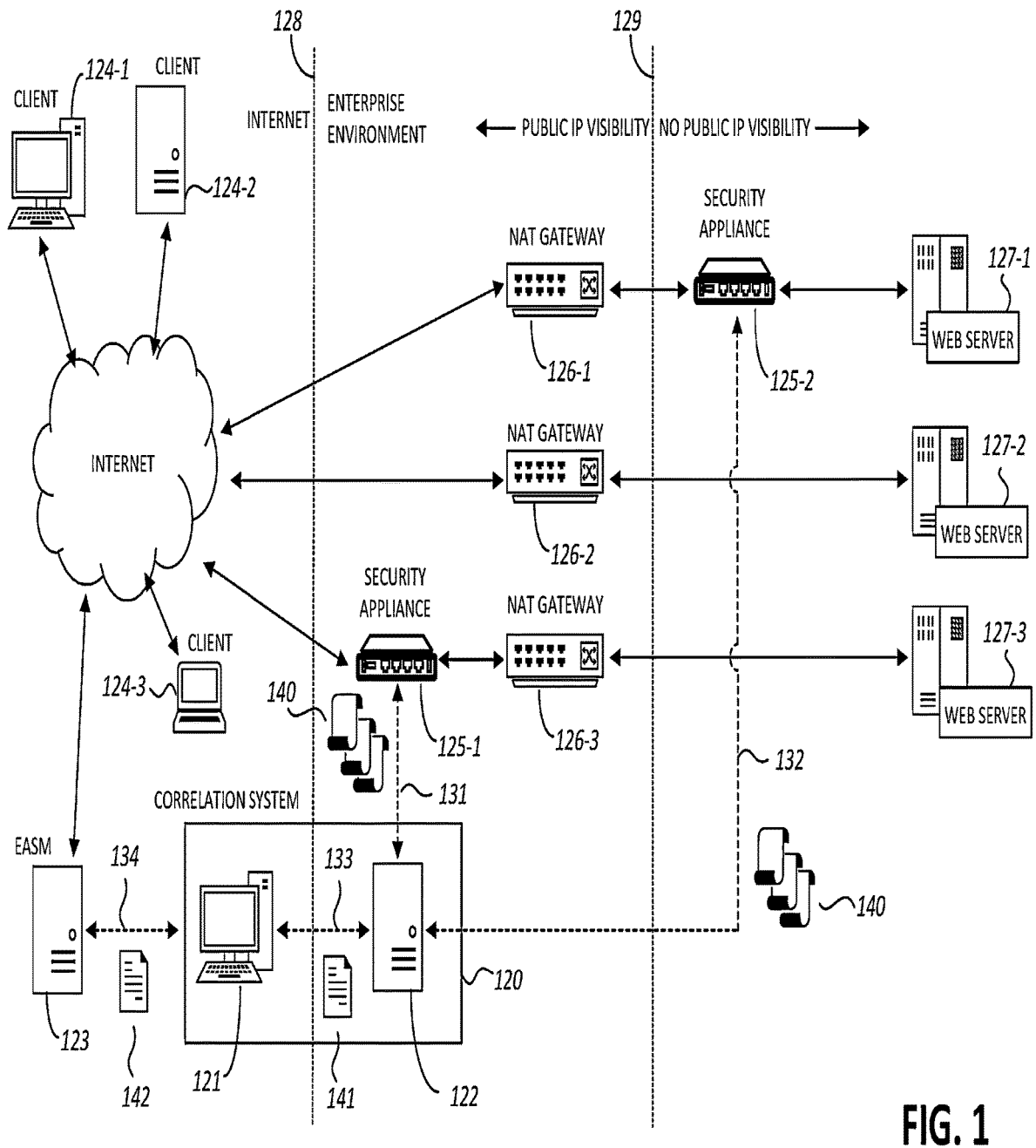
FIG. 1 shows a block diagram of a system for protecting public-facing computing assets of an organization in accordance with an embodiment of the present invention.

FIG. 1 shows a block diagram of a system for protecting public-facing computing assets of an organization (e.g., private company, government, educational institution, etc.) in accordance with an embodiment of the present invention. In the example of FIG. 1, the system includes a correlation system 120 and a plurality of security appliances 125 (i.e., 125-1, 125-2, etc.).

In the example of FIG. 1, the organization has a plurality of computing assets in the form of Web servers 127 (i.e., 127-1, 127-2, 127-3, etc.). Web servers are being used herein as examples of computing assets for illustration purposes only. As can be appreciated, embodiments of the present invention may be employed to protect computing assets other than Web servers.

A Web server 127 may be hosted by a dedicated server computer or by a cloud computing platform, such as the Amazon Web Services (AWS)™. A Web server 127 may provide a website, gaming, ecommerce, file storage, or other online service accessible over the Internet.

The Web servers 127 are public-facing in that they are accessible from the Internet. In the example of FIG. 1, the Web servers 127 can be accessed by one or more clients 124 (i.e., 124-1, 124-2, 124-3, etc.) on the Internet. A client 124 may comprise hardware (e.g., desktop computer, laptop) and software (e.g., web browser or client software) for accessing a Web server 127.

In the example of FIG. 1, a vertical dotted line 128 represents a logical boundary between the enterprise environment of the organization (to the right of the line 128) and the Internet (to the left of the line 128). The enterprise environment includes services (e.g., Web servers 127) and computing devices, such as the security appliances 125, a centralized security management system 122, and Network Address Translation (NAT) gateways 126 (i.e., 126-1, 126-2, 126-3, etc.), that are owned or operated by the organization.

In the example of FIG. 1, IP (Internet Protocol) addresses of components that are to the left of a dotted vertical line 129 are publicly visible (i.e., visible on the Internet); IP addresses of components that are to the right of the line 129 are not publicly visible. A NAT gateway 126 performs network address translation for a corresponding Web server 127. For example, the NAT gateway 126-1 hides the IP address of the Web server 127-1 from clients 124 on the Internet. The NAT gateways 126-2 and 126-3 perform the same function for the Web servers 127-2 and 127-3, respectively.

A security appliance 125 is a computing device that is configured to protect a Web server 127 from cyberattacks, such denial of service (DOS), spamming, unauthorized access, vulnerability exploits, etc. In one embodiment, a security appliance 125 is an inline Intrusion Prevention Systems (IPS) or next generation firewall, such as a TippingPoint IPS appliance from Trend Micro Incorporated. A security appliance 125 is configured to monitor and enforce security policies on network traffic between a Web server 127 and a client 124. The security policies may include blocking network traffic to and from unauthorized clients 124, blocking malicious network traffic, etc.

As will be more apparent below, to identify unprotected public-facing computing assets, a security appliance 125 captures certificate information of a digital certificate (e.g., Secure Socket Layer/Transport Layer Security certificate) transmitted between a Web server 127 and a client 124, and provides the certificate information to the correlation system 120. In the present disclosure, "certificate information" of a computing asset identifies the computing asset, and is extracted or derived from data of a digital certificate of the computing asset. Certificate information captured by a security appliance 125 from monitored network traffic is also referred to herein as "captured certificate information." In one embodiment, certificate information includes the public key in the certificate. The public key may be hashed for correlation purposes.

In the example of FIG. 1, the Web servers 127-1 and 127-3 are protected by security appliances 125-2 and 125-1, respectively, against cyberattacks from the Internet. On the other hand, the Web server 127-2 is unprotected in that there is no security appliance 125 or other security measure that protects it against cyberattacks from the Internet. Although a security appliance 125 or other security measure may be assigned to protect the Web server 127-2, it is very difficult for an organization with many computing assets to identify the Web server 127-2 or other public-facing computing assets that are in need of protection.

Generally, it is relatively difficult for an organization with many computing assets to map externally discovered public-facing computing assets to the corresponding internal assets and the protection controls that may or may not be deployed. In many cases, this results in these highly vulnerable computing assets remaining unprotected or incorrectly protected (either with no protection, or having incorrect configuration). Embodiments of the present invention address this difficulty.

An External Attack Surface Management (EASM) service 123 may comprise hardware and software of a commercially-available EASM service. In one embodiment, the EASM service 123 is the Trend Micro Vision One™ system.

The EASM service 123 scans the Internet for public-facing computing assets. The EASM service 123 is provided initial domain names or IP addresses (referred to as "seed") of an organization, which it uses to identify specific attack surfaces of computing assets owned by the organization. An attack surface is an entry point for unauthorized access to a computing asset, and includes vulnerabilities that can be exploited to carry out a cyberattack against the computing asset. It is to be noted that different EASM services may have different ways of discovering public-facing computing assets of organizations. EASM services other than the Trend Micro Vision One™ system may also be employed without detracting from the merits of the present invention.

In one embodiment, the EASM service 123 collects certificate information of digital certificates of discovered public-facing computing assets. Certificate information of a digital certificate of a discovered public-facing computing asset is also referred to herein as "discovered certificate information". Like captured certificate information captured by a security appliance 125 from monitored network traffic, discovered certificate information identifies a discovered public-facing computing asset, and is extracted or derived from data of a digital certificate of the discovered public-facing computing asset.

In the example of FIG. 1, the EASM service 123 scans the Internet to discover that the Web servers 127-1, 127-2, and 127-3 are public-facing. Upon discovery of the Web servers 127-1, 127-2, and 127-3 from the Internet, the EASM service 123 collects the certificate information of digital certificates of the Web servers 127-1, 127-2, and 127-3. The EASM service 123 creates a listing 142 of discovered certificate information of discovered public-facing computing assets, and provides the listing 142 to the correlation system 120 (see arrow 134). The EASM service 123 also identifies or collect information for identifying vulnerabilities, i.e., a flaw or weakness, of the discovered public-facing computing assets In the example of FIG. 1, the correlation system 120 comprises the centralized security management system (CSMS) 122 and a correlation platform 121. The CSMS 122 comprises hardware and software for controlling and coordinating the operations of the security appliances 125. The correlation platform 121 comprises hardware and software for collecting and correlating security-related data. In one embodiment, the CSMS 122 is the Trend Micro TippingPoint™ security management system, and the correlation platform 121 is the Trend Micro Vision One™ system. As can be appreciated, the correlation system 120 may also be implemented as a single system or using different systems with suitable functionality without detracting from the merits of the present invention.

In the example of FIG. 1, the CSMS 122 receives the certificate information 140 (see arrows 131 and 132) of digital certificates captured by the security appliances 125 from monitored network traffic. The CSMS 122 compiles the received certificate information 140 into a listing 141 of captured certificate information, and provides the listing 141 to the correlation platform 121 (see arrow 133).

The CSMS 122 also receives attack surface information of discovered public-facing computing assets from the EASM service 123. The attack surface information allows for identification of vulnerabilities of corresponding discovered public-facing computing assets. A security appliance 125 may have a filter or security policy for detecting and protecting against a particular vulnerability. Such filter or security policy may be enabled (or checked to ensure it is enabled) in a security appliance 125 that has been assigned to protect a discovered public-facing computing asset.

The correlation platform 121 correlates the listing 142 of discovered certificate information with the listing 141 of captured certificate information to identify one or more unprotected computing assets. For example, the correlation platform 121 may compare the certificate information in the listings 141 and 142 to identify certificate information that is indicated in the listing 142 but not in the listing 141.

Certificate information that is present in the listing 142 but not in the listing 141 is deemed to be that of an unprotected public-facing computing asset. More particularly, the listing 142 indicates certificate information of public-facing computing assets of the organization, whereas the listing 141 indicates certificate information detected by the security appliances 125 in monitored network traffic involving computing assets of the organization. Therefore, certificate information that is in the listing 142 but not in the listing 141 is that of a computing asset whose network traffic is not monitored by or does not pass through a security appliance 125, i.e., unprotected.

Certificate information that is present in both the listings 141 and 142 indicates that a discovered public-facing computing asset has an assigned security appliance 125. In that case, the discovered public-facing computing asset is deemed unprotected when a filter or security policy that addresses a vulnerability of the discovered public-facing computing asset is not enabled in the assigned security appliance 125.

Embodiments of the present invention provide advantages heretofore unrealized. First, by using certificate information instead of IP addresses to identify computing assets, the embodiments get around ambiguities caused by dynamic/ephemeral IP addresses and IP addresses that are behind NAT gateways. In addition, certificate information allows for more accurate correlation because the mapping of computing assets and certificate information does not rely on lower layers of the Open Systems Interconnection (OSI) stack. In other words, the deployment of computing assets in the enterprise environment does not appreciably affect the mapping.

Second, the embodiments allow for programmatic (i.e., automatic using program code) identification of unprotected public-facing computing assets. As can be appreciated, identifying unprotected computing assets manually is unreliable especially for organizations with multitudes of computing assets (e.g., hundreds of domain names).

Third, the embodiments allow consolidation of attack surface information and computing asset identification in the same system. For example, security personnel of the organization will be able to see the listing 142 of discovered certificate information and the listing 141 of captured certificate information on a display screen of the correlation platform 121. Because of the programmatic identification of unprotected computing assets, security personnel will be able to see at a glance which ones of the organization's computing assets are unprotected. In response, a security appliance 125 may be assigned to protect an identified unprotected computing asset, or a filter or security policy in an assigned security appliance 125 may be enabled to protect unprotected computing assets from vulnerabilities.

Figure 2:
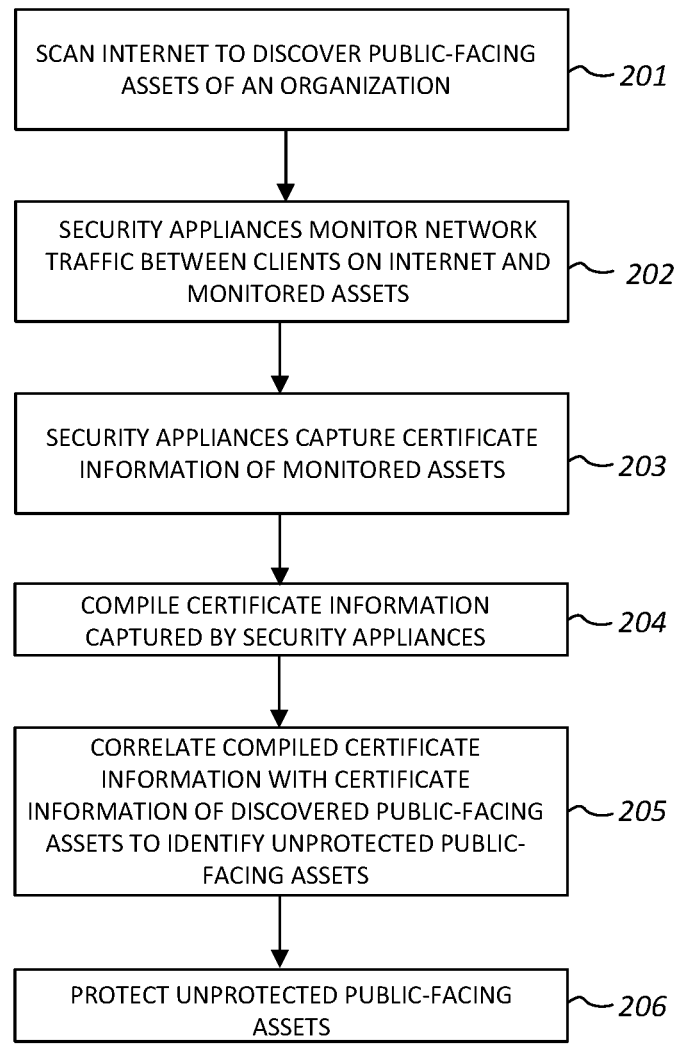
FIG. 2 shows a flow diagram of a method of protecting public-facing computing assets of an organization in accordance with an embodiment of the present invention.

FIG. 2 shows a flow diagram of a method of protecting public-facing computing assets of an organization in accordance with an embodiment of the present invention. The method of FIG. 2 is explained using components and steps discussed with reference to FIG. 1. As can be appreciated, other components and steps may also be employed without detracting from the merits of the present invention.

In the example of FIG. 2, an EASM service scans the Internet to discover public-facing computing assets of an organization, detect attack surfaces of the discovered public-facing computing assets, and collect certificate information of the discovered public-facing computing assets (step 201). One or more security appliances monitor network traffic between monitored computing assets of the organization and clients on the Internet (step 202). The security appliances capture certificate information of the monitored computing assets from the network traffic (step 203). A correlation system receives and compiles certificate information captured by the security appliances (step 204). The correlation system correlates the compiled certificate information with the certificate information of the discovered public-facing computing assets to identify unprotected public-facing computing assets of the organization (step 205). In response to detecting an unprotected public-facing computing asset, the unprotected public-facing computing asset is protected (step 206). Protecting the unprotected public-facing computing asset may include assigning a security appliance to protect the public-facing computing asset, enabling a filter or security policy on a security appliance that has been assigned to protect the public-facing computing asset, or performing other corrective action.

Figure 3:
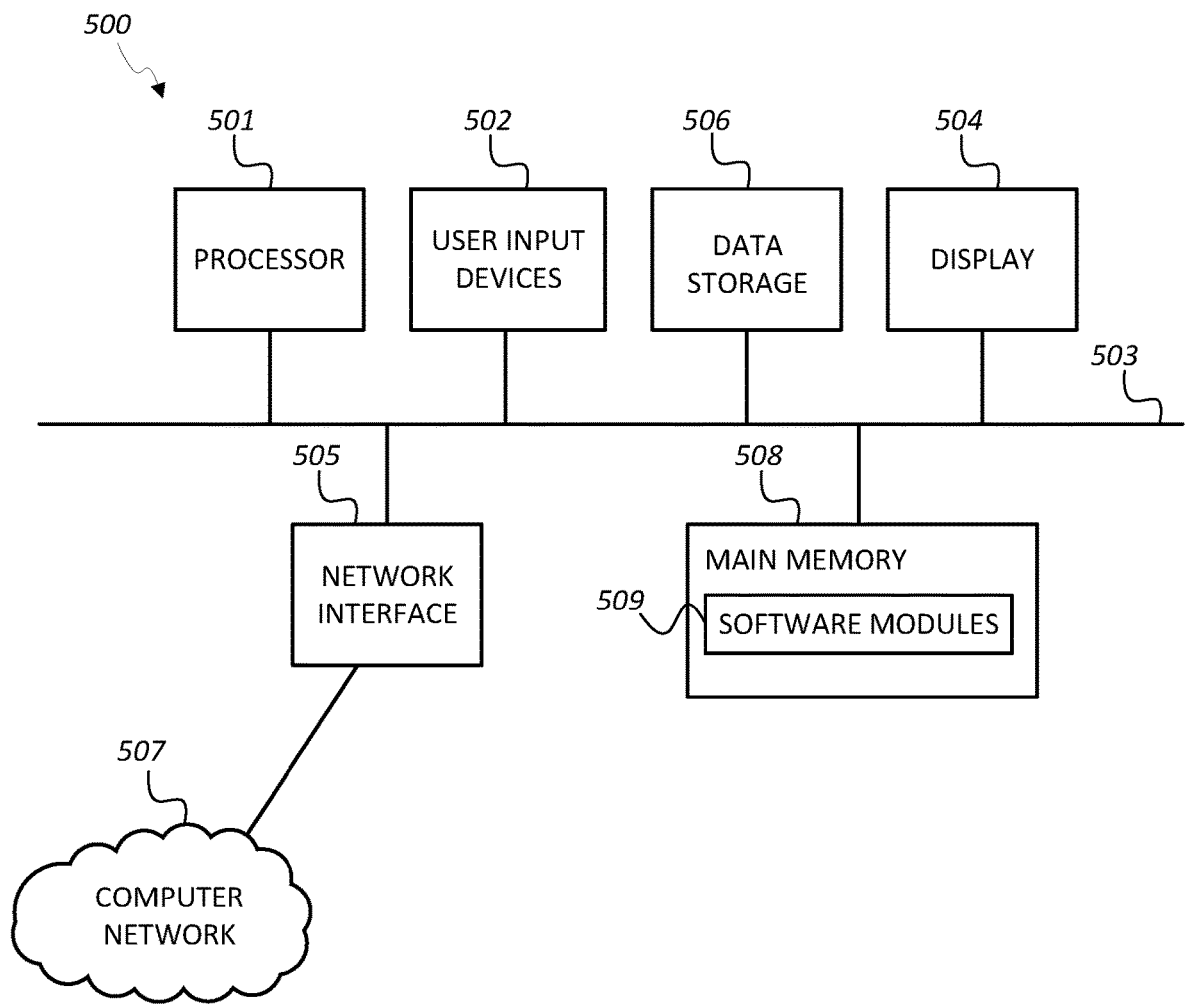
FIG. 3 shows a block diagram of a computer system that may be employed with embodiments of the present invention.

Referring now to FIG. 3, there is shown a block diagram of a computer system 500 that may be employed with embodiments of the present invention. The computer system 500 may be employed as a correlation system, security appliance, or other computer system described herein. The computer system 500 may have fewer or more components to meet the needs of a particular cybersecurity application. The computer system 500 may include one or more processors 501. The computer system 500 may have one or more buses 503 coupling its various components. The computer system 500 may include one or more user input devices 502 (e.g., keyboard, mouse), one or more data storage devices 506 (e.g., hard drive, optical disk, solid state drive), a display screen 504 (e.g., liquid crystal display, flat panel monitor), a computer network interface 505 (e.g., network adapter, modem), and a main memory 508 (e.g., random access memory). The computer network interface 505 may be coupled to a computer network 507, which in this example includes the Internet.

The computer system 500 is a particular machine as programmed with one or more software modules 509, comprising instructions stored non-transitory in the main memory 508 for execution by a processor 501 to cause the computer system 500 to perform corresponding programmed steps. An article of manufacture may be embodied as computer-readable storage medium including instructions that when executed by the processor 501 cause the computer system 500 to be operable to perform the functions of the one or more software modules 509.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting public-facing computing assets of an organization, the method comprising:
   receiving a first set of certificate information of digital certificates of discovered public-facing computing assets of a plurality of computing assets of an organization, the discovered public-facing computing assets being discovered to be accessible from the Internet;

monitoring, by a plurality of security appliances, network traffic between clients on the Internet and monitored computing assets of the plurality of computing assets;

capturing a second set of certificate information of digital certificates of the monitored computing assets;

identifying an unprotected computing asset of the plurality of computing assets by correlating the first set of certificate information with the second set of certificate information, the unprotected computing asset not being protected by at least one of the plurality of security appliances; and in response to identifying the unprotected computing asset, protecting the unprotected computing asset.

2. The method of claim 1, wherein correlating the first set of certificate information with the second set of certificate information includes identifying a certificate information that is present in the first set of certificate information but not present in the second set of certificate information.

3. The method of claim 1, wherein the plurality of security appliances includes an Intrusion Prevention System (IPS).

4. The method of claim 1, wherein the plurality of computing assets of the organization includes a web server.

5. The method of claim 1, wherein the first set of certificate information of the digital certificates of the discovered public-facing computing assets is received from an External Attack Surface Management (EASM) service.

6. The method of claim 1, wherein the first and second sets of certificate information are from Secure Socket Layer/Transport Layer Security certificates.

7. A computer system comprising a memory and at least one processor, the memory storing instructions that when executed by the at least one processor cause the computer system to:

receive a first set of certificate information of digital certificates of discovered public-facing computing assets of a plurality of computing assets of an organization, the discovered public-facing computing assets being discovered to be accessible from the Internet;

receive a second set of certificate information of digital certificates captured by a plurality of security appliances from network traffic between clients on the Internet and monitored computing assets of the plurality of computing assets; and identify an unprotected computing asset of the plurality of computing assets by correlating the first set of certificate information with the second set of certificate information, the unprotected computing asset not being protected by at least one security appliance of the plurality of security appliances.

8. The computer system of claim 7, wherein the unprotected computing asset has a vulnerability, and a filter or security policy that addresses the vulnerability is not enabled in a security appliance assigned to the unprotected computing asset.

9. The computer system of claim 7, wherein the plurality of security appliances includes a Next Generation Firewall (NGFW).

10. The computer system of claim 7, wherein the plurality of security appliances includes an Intrusion Prevention System (IPS).

11. The computer system of claim 7, wherein the plurality of computing assets of the organization includes a web server.

12. The computer system of claim 7, wherein the instructions, when executed by the at least one processor cause the computer system to correlate the first set of certificate information with the second set of certificate information by:

identifying a certificate information that is present in the first set of certificate information but not in the second set of certificate information.

13. A system for protecting public-facing computing assets of an organization, the system comprising:

a plurality of security appliances that are inline between clients on the Internet and monitored computing assets of a plurality of computing assets of an organization; and a correlation system, the correlation system comprising a memory and at least one processor, the memory of the correlation system storing instructions that when executed by the at least one processor of the correlation system cause the correlation system to:

receive a first set of certificate information of digital certificates of discovered public-facing computing assets of a plurality of computing assets of an organization, the discovered public-facing computing assets being discovered to be accessible from the Internet;

receive a second set of certificate information of digital certificates captured by the plurality of security appliances in network traffic between the clients on the Internet and the monitored computing assets; and identify an unprotected computing asset of the plurality of computing assets by correlating the first set of certificate information with the second set of certificate information, the unprotected computing asset not being protected by at least one security appliance of the plurality of security appliances.

14. The system of claim 13, further comprising:

a computer system of an External Attack Surface Management (EASM) service that provides the first set of certificate information to the correlation system.

15. The system of claim 13, wherein the digital certificates of the discovered public-facing computing assets and the digital certificates captured by the plurality of security appliances are Secure Socket Layer/Transport Layer Security certificates.

16. The system of claim 13, wherein the plurality of security appliances includes a Next Generation Firewall (NGFW).

17. The system of claim 13, wherein the plurality of security appliances includes an Intrusion Prevention System (IPS).

18. The system of claim 13, wherein the plurality of computing assets of the organization includes a web server.

19. The system of claim 13, wherein the instructions stored in the memory of the correlation system, when executed by the at least one processor of the correlation system, cause the correlation system to correlate the first set of certificate information with the second set of certificate information by:

identifying certificate information that is present in the first set of certificate information but not in the second set of certificate information.

20. The system of claim 13, wherein the unprotected computing asset has a vulnerability, and a filter or security policy that addresses the vulnerability is not enabled in a security appliance assigned to the unprotected computing asset.

* * * * *